Aug. 15, 1961 R. W. BERNSTEIN ET AL Re. 25,026

ABRASIVE WHEEL AND REPLACEABLE ABRASIVE UNIT THEREFOR

Original Filed April 8, 1957

RUSSELL W. BERNSTEIN
ALECK BLOCK
INVENTORS.

BY Lyon & Lyon

ATTORNEYS.

United States Patent Office

Re. 25,026
Reissued Aug. 15, 1961

25,026

ABRASIVE WHEEL AND REPLACEABLE ABRASIVE UNIT THEREFOR

Russell W. Bernstein and Aleck Block, Los Angeles, Calif., assignors to Merit Products, Inc., Culver City, Calif., a corporation of California Original No. 2,843,980, dated July 22, 1958, Ser. No. 651,509, Apr. 8, 1957. Application for reissue Oct. 23, 1959, Ser. No. 848,483

19 Claims. (Cl. 51—193.5)

Matter enclosed in heavy brackets [ ] appears in the original patent but forms no part of this reissue specification; matter printed in italics indicates the additions made by reissue.

This invention relates to abrasive wheels and replaceable abrasive units therefor, and included in the objects of this invention are:

First, to provide an abrasive wheel wherein a plurality of abrasive units, each comprising a multiplicity of *radiating* abrasive [radiating] sheets secured to a reinforcing *anchor* plate, are mounted on a hub structure, and wherein means are provided to secure the abrasive units in place by engagement with said [reinforcing] *anchor* plates, so that the abrasive wheel may be safely rotated at high speed.

Second, to provide an abrasive wheel, including replaceable abrasive units, which is so arranged that the abrasive units may be readily and quickly removed when worn and new abrasive units substituted, all without the use of special tools.

Third, to provide an abrasive wheel with replaceable abrasive units which incorporates special means to aid in initial retention of the units during assembly and which cannot be assembled except in the correct manner, so that assembly or replacement may be made by unskilled or untrained persons without danger of malfunctioning of the abrasive wheel.

Fourth, to provide a replaceable abrasive unit wherein a stack of abrasive-coated sheets are compressed adjacent one margin to impress and embed the irregularities of each sheet into the adjacent sheets, and are tightly secured in such compressed condition to a metal anchor plate by staples or other fastening means so that the sheets are bound tightly to each other and to the plate, to resist removal of any of the sheets; and wherein the abrasive unit forms abutment shoulders on opposite sides of the anchor plate for engagement with a mounting hub to aid the plate in resisting lateral loads imposed on the abrasive unit.

Fifth, to provide a replaceable, multiple sheet, abrasive unit having an anchor plate, the ends of which protrude from the radially inner side of the unit as well as axially therefrom so as to be restrained against radial displacement by an overlying retaining ring engaging each axially protruding end of the plate, and be restrained against buckling or lateral forces by hub slots engaging the radially inner protruding margin of the plate.

Sixth, to provide an abrasive wheel wherein a series of abrasive units, each of which is essentially wedge-shaped in cross section by reason of being compressed along one margin, are fitted endwise on a hub structure in closely adjacent relation with each other, so that the abrasive units mutually support each other against tangential loads, as imposed when the extremities of the abrasive units are engaged by a workpiece.

With the above and other objects in view as may appear hereinafter, reference is directed to the accompanying drawings in which.

Figure 1:
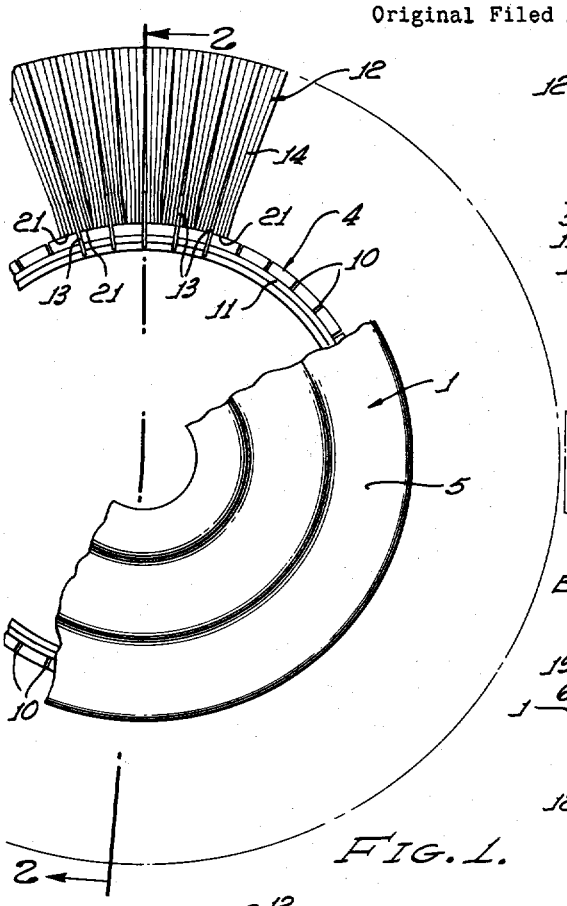
FIGURE 1 is a fragmentary end view of the abrasive wheel with a view of the abrasive units shown in position thereon.

The abrasive wheel includes a pair of end plates 1, each having a central bore 2 for installation on a shaft, not shown. The confronting sides of the end plates 1 are provided with annular shoulders 3 which support the ends of a hub cylinder 4. The end plates project radially beyond the ends of the hub cylinder 4, forming flanges 5 having annular channels 6 and 7 which face toward the ends of the hub cylinder 4. The channel 6 extends radially inwardly to the corresponding shoulder 3, whereas the channel 7 terminates short of the shoulder to form a stop 8 which is engaged by the corresponding end of the hub cylinder 4. Formed at the radially outer margins of the channels 6 and 7 are retaining lips 9.

The hub cylinder 4 is provided externally with a plurality of axially directed narrow grooves or slits 10 extending the full length of the hub cylinder. One end of the hub cylinder 4 is provided with an annular axially directed rib 11 radially inward of the grooves or slits 10, which, as will be brought out hereinafter, facilitates the mounting of abrasive units on the hub structure. The inner margin of the channel 6 clears the end of the hub cylinder 4 having the annular rib 11.

Figure 4:
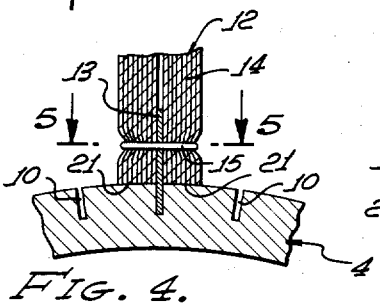
FIG. 4 is an enlarged fragmentary sectional view through 4—4 of FIG. 2.
Figure 3:
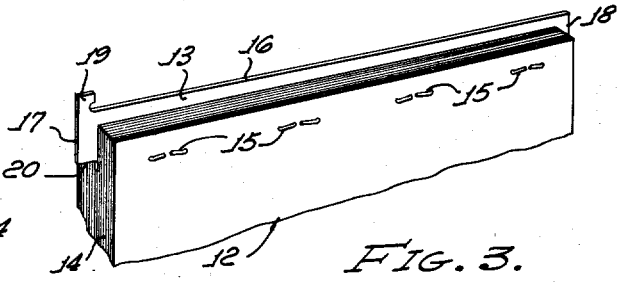
FIG. 3 is a fragmentary perspective view showing the secured end of an abrasive unit.
Figure 5:
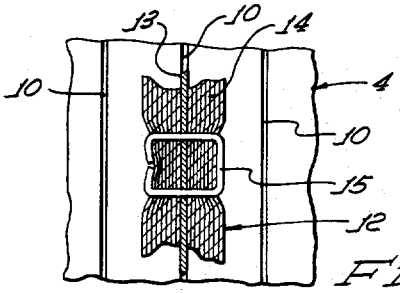
FIG. 5 is a fragmentary sectional view through 5—5 of FIG. 4.

The hub cylinder 4 supports a plurality of abrasive units 12. Each abrasive unit includes a metal anchor plate 13 to which is secured a stack of abrasive sheets 14. The abrasive sheets are compressed adjacent one margin so that the irregularities of each sheet are impressed into the adjacent sheets to effectively interlock the sheets together. The sheets are secured in such compressed condition by heavy duty staples 15 which extend laterally through the abrasive sheets and the anchor plate, as indicated in FIGS. 4 and 5.

The abrasive sheets 14 may be formed of various abrasive sheet materials, such as cloth or paper, coated with abrasive. All of the sheets may be abrasive coated, or lubricant or spacer sheets may be interleaved. Also, the sheets may be initially free of abrasive. For example, cloth sheets, preferably cut to dispose the warp and woof on the bias, may be used. In such case, the abrasive, usually rouge or other fine abrasive or polishing material, is applied during the course of use of the wheel.

The abrasive sheets when stacked have a limited amount of compressibility so that when compressed adjacent one margin the stack is essentially wedge-shaped in cross section. The retentative force between the secured areas of the sheets is in excess of the tensional strength of the free sheet, so that irrespective of the loads imposed by rotation of the wheel and the application of workpieces to the surface of the wheel, the abrasive sheets are securely held.

Each anchor plate 13 protrudes from the secured margins of the abrasive sheets 14 to form a protruding rib 16, which also protrudes from the ends of the stack of sheets to form locking elements 17 and 18 which fit respectively in the channels 6 and 7 when the rib 16 is placed in one of the grooves or slits 10. The locking element 17 terminates in a hook 19 which is adapted to overlie the corresponding end of the hub cylinder 4 and engage the annular rib 11. As it is desired that the radially outer edges of the anchor plates 13 be substantially flush with the peripheries of the end plates 1, the radially outer corners of the anchor plates 13 may be provided with notches 20.

The abrasive units 12 are formed as follows:

A plurality of identically shaped sheets 14, with or without abrasive, as desired, are placed on one or both sides of the metal anchor plate 13 in such a manner that the plate 13 is disposed adjacent one edge of the stack of sheets, with the rib 16 protruding from the stack and with its ends 17 and 18 also protruding. The stack is then compressed sufficiently to cause interlocking of the surfaces of the sheets due to the pressure of abrasive or the weave of the cloth. A plurality of the metal staples 15 is then driven through the entire unit, including the anchor plate 13, and clinched so as to secure the sheets in their compressed condition.

The staples 15 firmly bind the elements together to form a laminated pack of abrasive sheets, the elements of which are so compressed adjacent the staples 15 that they reinforce each other. In use, the abrasive unit 12 is so formed to resist bending and to resist the separation of any of the individual components from the pack. Each of the abrasive sheets 14 is thus provided with increased resistance to the centrifugal and other separating forces which it encounters in use.

Figure 2:
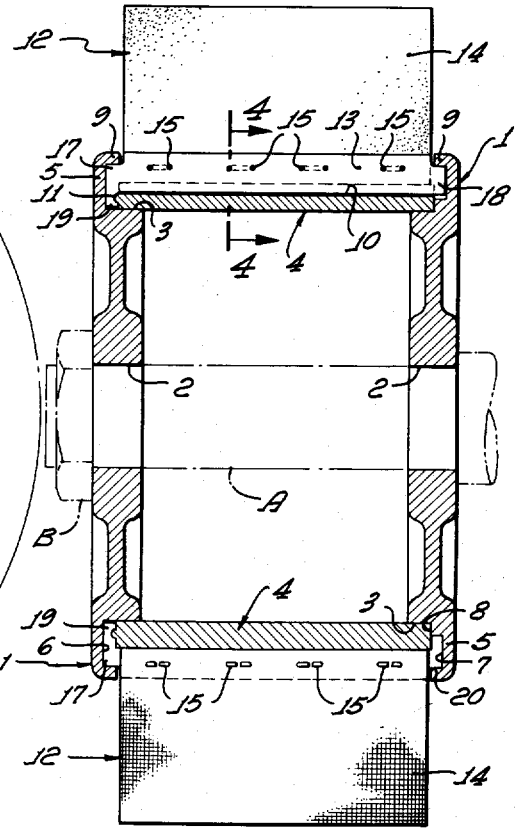
FIG. 2 is a sectional view thereof through 2—2 of FIG. 1.

The completed abrasive units 12 are assembled on the wheel as follows:

The end plate 1 having the channel 7 is preferably placed on a horizontal surface and the hub cylinder 4 fitted thereon with the slits 10 disposed vertically. The abrasive units 12 are then assembled by inserting the rib portions 16 of the anchor plates 13 into the slits 10 and moving the abrasive units axially until the locking elements 18 enter the channel 7. Simultaneously, the hook 9 is caused to engage the annular rib 11. The annular rib 11 and channel 7 cooperate to hold the abrasive units 12 in position pending installation of the remaining end plate 1. After assembly of the abrasive units, this end plate is positioned over the corresponding end of the hub cylinder 4 so that the channel 6 receives the locking elements 17. The assembled abrasive wheel is then mounted on a suitable drive shaft A, indicated by broken lines in FIG. 2, which is screw-threaded and provided with a nut B so that the end plates 1 and hub structure may be secured together.

While the abrasive wheel may be assembled with ease when its axis is vertical, it is nevertheless convenient, when the wheel is in use, to replace the abrasive units when the axis of the abrasive wheel is horizontal, that is, while mounted on its drive shaft. In this case, the end plate 1 bearing the channel 6 is slipped axially far enough to clear the locking elements 17. Worn abrasive units may then be removed by slipping them axially until the locking elements 18 clear the channel 7 and the hooks 19 are free of the rib 11, whereupon the abrasive units 12 may be removed radially. New units are inserted by fitting the ribs 16 into the slits 10 and slipping the anchor plates 13 axially to engage the locking elements 18 and hooks 19. The abrasive wheel may be turned as the assembly proceeds until all of the abrasive units 12 are in place; whereupon the end plates 1 are tightened axially.

It will be observed that the end plate 1 having the channel 6 bears axially against the locking elements 17 so that the abrasive units 12 are firmly held in place. The retaining lips 9 overlie the radially outer margins of the locking elements 17 and 18 so that the abrasive units are securely restrained against the centrifugal force produced on rotation of the abrasive wheel.

By reason of the fact that the grooves or slits 10 extend the full length of the anchor plates 13, the anchor plates cannot bend laterally. The radial depth of the anchor plates is such that the anchor plates readily withstand any tendency to bend lengthwise. Thus, the anchor plates, although formed of sheet metal, are so secured as to resist the relatively extreme forces which are applied when the abrasive wheel is rotated at high speed and workpieces are thrust against the abrasive sheets.

By reason of the compression afforded by the staples 15, the free ends of the abrasive sheets 14 tend to fan out from each other so that when assembled on the hub cylinder 4 the free extremities of the sheets are substantially equally spaced.

It will be observed that the root end of the divided stack forms shoulders 21 on opposite sides of the anchor plates 13 which bear against the hub cylinder 4 and reinforce the anchor plate against bending *circumferentially* at its line of emergence from the slot 10. The degree of reinforcement afforded by the tightly compressed stack of sheets is substantial.

When all of the abrasive units 12 are in place around the periphery of the hub structure, the surfaces of each abrasive unit 12 are disposed in bearing engagement with the surfaces of the abrasive units on each side. Each of the abrasive units 12 thus reinforces the others to strengthen the abrasive units 12 and sheets 14 against any *circumferential* bending [or sideward movement] at its root or secured end adjacent the periphery of the hub [structure] *cylinder*.

While a particular embodiment of this invention has been shown and described, it is not intended to limit the same to the exact details of the construction set forth, and it embraces such changes, modifications, and equivalents of the parts of their formation and arrangement as come within the purview of the appended claims.

What is claimed is:

1. An abrasive wheel, comprising: a cylindrical hub having a plurality of continuous axially directed slots; end flanges for said hub including annular lips confronting the ends of said slots; *and* a plurality of *abrasive segments, each comprising an anchor plate* [anchor plates, each] positioned edgewise in a slot and restrained throughout its length against bending about an axis radial of said hub, the axial ends of each anchor plate extending between said hub and said annular lips and restrained by said lips *to provide the sole means for anchoring said abrasive segments* against radial displacement; a *pack* [stack] of sheets compressed against each anchor plate; binding means penetrating each *pack* [stack] of sheets and the corresponding plate to secure said sheets in compressed condition relative to each other and said anchor plate [; said stack of sheets] *so as to provide a rigid butt section reinforced against bending transversely of the longitudinal axis of said anchor plate, said butt section* forming a shoulder extending laterally of said anchor plate for bearing engagement with the surface of said hub to reinforce said anchor plate against bending about an axis parallel to said hub; each *pack* [of said stack] of sheets also being in abutting relation with adjacent *packs* [stacks] of sheets thereby to mutually support each other.

2. An abrasive wheel, comprising: a cyclindrical hub having a plurality of continuous axially directed slots; a plurality of anchor plates, each adapted to be positioned edgewise in a slot and restrained throughout its length by said hub against bending about an axis radial of said hub; an annular lip disposed radially outwardly of one end of said hub; an annular rib disposed radially inwardly of the periphery of the hub at the other end thereof; each of said anchor plates having an axial projection at one end arranged to fit under said lip and a hook at its other end arranged to fit under said rib upon axial movement of said anchor plate relative to said hub, to restrain said anchor plates from radial displacement during assembly of said anchor plates on said hub; a second annular lip cooperating with the radially outer edge of the hook ends of said anchor plates to lock said plates relative to said hub; a stack of sheets compressed against each anchor plate; and means penetrating each stack of sheets and corresponding anchor plate to secure said sheets in compressed condition relative to each other and said anchor plate; said stack of sheets forming a shoulder extending laterally of said anchor plate for bearing engagement with the surface of said hub to reinforce said anchor plate against bending about an axis parallel to said hub.

3. An abrasive wheel, comprising: a cylindrical hub having a plurality of continuous axially directed slots; a plurality of anchor plates, each adapted to be positioned edgewise in a slot and restrained throughout its length by said hub against bending about an axis radial of said hub; means for retaining said anchor plates in said slots against radial displacement; a plurality of *packs* [stacks] of flexible sheet members, each of said *packs* [stacks] being divided to straddle a corresponding anchor plate and extend radially therebeyond, said sheets having limited compressibility in a direction transverse to said *packs* [stacks]; a plurality of staples extending transversely through each *pack* [stack] and its anchor plate to secure said sheets in a compressed condition against each other and said anchor plate, thereby to resist radial displacement relative to each other and to said anchor plates; said *pack* [stack] of sheets forming a shoulder extending laterally of said plate for bearing engagement with the surface of said hub to reinforce said anchor plate against bending about an axis parallel to said hub.

4. An abrasive wheel, comprising: a cylindrical hub having a plurality of continuous axially directed slots; end flanges for said hub including annular lips confronting the ends of said slots; a plurality of anchor plates, each positioned edgewise in a slot and restrained throughout its length against bending about an axis radial of said hub[,]; [the axial ends of each anchor plate extending between said hub and said annular lips and restrained by said lips against radial displacement;] a plurality of *packs* [stacks] of flexible sheet members, each of said *packs* [stacks] being divided to straddle a corresponding anchor plate and extend radially therebeyond, said sheets having limited compressibility in a direction transverse to said *packs* [stacks]; a plurality of staples extending transversely through each *pack* [stack] and its anchor plate, said staples securing said [stacks] *packs* in a compressed condition, thereby to restrain said sheets against radial displacement relative to each other and to said anchor plates *and to reinforce said anchor plates against bowing radially outwardly under the effect of centrifugal force*; said *pack* [stack] of sheets forming a shoulder extending laterally of said plate for bearing engagement with the surface of said hub to reinforce said plate against bending about an axis parallel to said hub; each of said [stacks] *packs* of sheets also being disposed in abutting relation with adjacent stacks of sheets, whereby said *packs* [stacks] of sheets reinforce each other against bending or sideward movement in the region of said anchor plates*; said anchor plates having end portions projecting in opposite directions from respective sides of said pack and extending between said hub and said annular lips to provide the sole means anchoring said packs to said hub against radially outward displacement.*

5. An abrasive wheel, comprising: a cylindrical hub having a plurality of continuous axially directed slots; a plurality of anchor plates, each adapted to be positioned edgewise in a slot and restrained throughout its length by said hub against bending about an axis radial of said hub; an annular lip disposed radially outwardly of one end of said hub; an annular rib disposed radially inwardly of the periphery of the hub at the other end thereof; each of said anchor plates having an axial projection at one end arranged to fit under said annular lip and a hook at its other end arranged to fit under said rib upon axial movement of said plate relative to said hub, to restrain said anchor plates from radial displacement during assembly of said plates on said hub; a second annular lip cooperating with the radially outer edge of the hook ends of said plates to lock said anchor plates relative to said hub; said annular lips forming means for retaining said anchor plates in said slots against radial displacemembers, each of said *packs* [stacks] of flexible sheet members, each of said *packs* [stacks] being divided to straddle a corresponding anchor plate and extend radially therebeyond, said *pack* [stack] of sheets having limited compressibility in a direction transverse to said *packs* [stacks]; and a plurality of staples extending transversely through each *pack* [stack] and its anchor plate, said staples securing said [stacks] *packs* in a compressed condition thereby to restrain said sheets against radial displacement relative to each other and to said anchor plates; said [stack] *pack* of sheets forming a shoulder extending laterally of said plate for bearing engagement with the surface of said hub to reinforce said anchor plate against bending about an axis parallel to said hub.

[6. A replaceable abrasive unit for cylindrical hub structures having axial slots and retaining means, comprising: an anchor plate; a stack of flexible sheet members, said stack being divided at one margin to straddle said anchor plate, said sheets having limited compressibility in a direction transverse to said stack; and a plurality of staples extending transversely through said stack and anchor plate, each staple securing said sheets in a compressed condition to lock said sheets in said stack and to said anchor plate; said anchor plate protruding from said stack to fit a slot of said hub structure and having means for engagement by said retaining means.]

7. A replaceable abrasive unit for cylindrical hub structures having axial slots and retaining means confronting the extremities of said hub structures, comprising: an anchor plate; a [stack] *pack* of flexible sheet members, said stack being divided at one margin to straddle said plate, said *pack* [stack] of sheet members having limited compressibility in a direction transverse to said *pack* [stack]; and a plurality of staples extending transversely through said *pack* [stack] and anchor plate, each staple securing said sheet members in a compressed condition to lock said sheet members in said *pack* [stack] and to said anchor plate; said anchor plate protruding from an edge of said *pack* [stack] to fit a slot of said hub structure and protruding from the ends of said *pack* [stack] to engage said retaining means; said *packs* [stacks] of sheet members tending by reason of their compressed condition to assume a wedge shape whereby the *pack* [stack] of sheet members, when assembled on said hub structure, afford mutual support to reinforce said anchor plates; said *pack* [stack] of sheet members forming shoulders at their stapled ends extending laterally from their anchor plates for engagement with said hub structure thereby to further reinforce said anchor plates.

8. A replaceable abrasive unit for cylindrical hub structures having axial slots, a retaining rib at one axial end and flanges at both ends having retaining lips radially outward of the ends of the hub, said abrasive unit, comprising: an anchor plate; a *pack* [stack] of flexible sheet members, said *pack* [stack] being divided at one margin to straddle said anchor plate, said *pack* [stack] of sheet members having limited compressibility in a direction transverse to said *pack* [stack]; and a plurality of staples extending transversely through said *pack* [stack] and anchor plate, each staple securing said sheet members in a compressed condition to lock said sheet members in said *pack* [stack] and to said anchor plate; said anchor plate protruding from an edge of said *pack* [stack] to fit a slot in said hub structure and protruding from the ends of said *pack* [stack] between said hub and retaining lips; said plate also having a hook at one end engageable with said retaining rib.

[9. A plurality of abrasive units arranged to be removably mounted around the periphery of a slotted hub structure having end-retaining flanges, each of said abrasive units comprising: an anchor plate adapted to be positioned edgewise in a slot in said hub with its ends extending under said retaining flanges; a stack of sheets compressed against each anchor plate; fastening means penetrating each stack of sheets and corresponding anchor plate to secure the margins of said sheets overlying said anchor plate in a relatively rigid and compressed condition relative to each other and said anchor plate the compressed and secured margins of said abrasive units forming lateral shoulders for bearing engagement with said hub to resist bending of said anchor plates; said abrasive units, when assembled on said hub structure, being disposed in abutting relation with each other whereby said abrasive units in addition to said shoulder mutually reinforce each other against bending or sideward movement in the region of said anchor plate.]

[10. A plurality of abrasive units arranged to be removably mounted around the periphery of a slotted hub structure having end-retaining flanges, said abrasive units comprising: a plurality of anchor plates, each adapted to be positioned edgewise in a slot and restrained thereby throughout its length by said hub structure against bending about an axis radial of said hub structure, and restrained at its ends against radial displacement by said retaining flanges; a plurality of stacks of flexible sheet members, each of said stacks being divided to straddle a corresponding anchor plate and extend radially therebeyond, said sheets having limited compressibility in a direction transverse to said stacks; a plurality of staples extending transversely through each stack and its anchor plate to secure said sheets in a compressed condition against each other and said anchor plate, thereby to resist radial displacement relative to each other and to said anchor plates; said stack of sheets forming a shoulder extending laterally of said plate for bearing engagement with the surface of said hub to reinforce said anchor plate against bending about an axis parallel to said hub.]

11. A replaceable abrasive unit for cylindrical hub structures having axial slots and retaining means, comprising: [an] *a rigid* anchor place; a *pack* [stack] of flexible *abrasive coated* sheet members, said sheets having limited compressibility in a direction transverse to said *pack* [stack], said *pack* [stack] disposed on at least one side of said anchor plate to form a lateral shoulder; a plurality of clamping and fastening means penetrating said [stack] *pack* and plate and compressing said stack to impart increased rigidity in the region of said shoulder whereby when assembled on said drum with said anchor plate within a slot thereof, said anchor plate is reinforced against bending *outwardly under the pull of centrifugal force* [about an axis parallel to said hub axis], said anchor plate *having respective end portions* protruding axially from said *pack* [stack] *beyond the side margins of said pack* for engagement by said retaining means.

*12. A replaceable abrasive unit for a hub structure including a hub cylinder having an axially extending slot and retaining means at the respective ends thereof, comprising: an elongated anchor plate; a pack of abrasive coated sheets having limited transverse compressibility disposed on at least one side of said anchor plate with root portions thereof in overlapping relation to one longitudinal marginal portion of the plate and with the other longitudinal marginal portion of the plate projecting from said pack and receivable in said slot; and a plurality of clamping and fastening means penetrating said root portions and plate and compressing said root portions to interlock the same together and impart increased rigidity thereto, whereby when assembled on said hub cylinder with said anchor plate received in said slot, said anchor plate is reinforced against bending transversely of its longitudinal axis, said anchor plate having end portions protruding axially from said pack for engagement by said retaining means at the respective ends of the hub structure.*

*13. A rotary abrasive drum including: a hub cylinder and a plurality of segmental abrasive units removably mounted around the periphery thereof, said hub cylinder having circumferentially spaced axially extending radial slots and having associated therewith, at respective ends thereof, retainer flanges with axially extending peripheral retainer lips, each of said abrasive units comprising: an elongated anchor plate; a pack of abrasive coated sheets having respective root portions in overlapping relation to one longitudinal marginal portion of said plate with the*

*remainder of the sheets projecting radially outwardly therefrom for operation upon work; fastener means penetrating said root portions and anchor plate and securing said root portions to said plate in relatively rigid and compressed condition in which said root portions are interlocked against one another to reinforce said plate against bending along its longitudinal axis under the effect of centrifugal force, and with the other longitudinal marginal portion of said plate projecting from the pack and receivable in a respective slot of said hub cylinder and deriving support therefrom to support the pack against tilting circumferentially of the hub cylinder, the ends of said anchor plate protruding in opposite directions from respective sides of said pack for engagement by said retainer lips to secure the pack against radially outward displacement from the hub cylinder under centrifugal force, said abrasive units, when assembled on said hub structure, being disposed in abutting relation to one another whereby to further reinforce them against circumferential bending movements.*

*14. A replaceable abrasive unit for mounting in a hub cylinder having an axial slot and having at the respective ends thereof, retainer flanges embodying axially projecting peripheral retainer lips, comprising: an elongated anchor plate; a pack of flexible abrasive sheets arranged in two opposed groups having root portions in overlapping relation to one longitudinal marginal portion of said plate on respective sides thereof and having body portions projecting radially beyond said plate for operation on work; a plurality of securing elements extending through said root portions and through said plate and securing the abrasive sheets to the plate with the other longitudinal marginal portion of the anchor plate projecting from the pack for reception in said hub cylinder slot, said securing elements clamping said root portions to said plate in compressed condition wherein the abrastive surfaces of respective root portions are impressed into the back surfaces of adjoining root portions to lock said root portions to one another and to provide rigidifying reinforcement of said anchor plate to resist radially outward bending thereof with respect to the hub cylinder under the effect of centrifugal force, said anchor plate having end portions projecting from said pack for engagement beneath said retainer lips to anchor the pack to the hub cylinder.*

*15. An abrasive wheel comprising: a hub cylinder having a plurality of circumferentially spaced axially extending radial slots opening outwardly at the periphery thereof; end flanges for said hub including annular retainer lips confronting the ends of said slots; a plurality of elongated anchor plates, each having one longitudinal marginal portion received in a respective slot and thereby restrained throughout its length against circumferential bending, the axial ends of each anchor plate extending between said hub and respective retainer lips and restrained thereby against radial displacement; a plurality of packs of flexible abrasive sheets, each pack having respective root portions in overlapping relation to and secured to an opposite longitudinal marginal portion of a respective anchor plate, in compressed condition wherein the interengaging surfaces of the abrasive sheets are locked to one another to strengthen and rigidify the anchor plates against radially outward bending under the effect of centrifugal force; said packs being disposed with their respective root portions in circumferentially abutting relation to one another whereby to further reinforce the same against said circumferential bending when the abrasive wheel is being rotated against the work.*

*16. A discardible, replaceable segmental abrasive unit adapted to be removably mounted to the periphery of a hub having circumferentially spaced axially extending radial slots and having associated therewith, at respective ends thereof, retainer flanges with axially extending peripheral retainer lips, said abrasive unit comprising: an elongated anchor plate; a pack of abrasive-coated sheets having respective root portions in overlapping relation*

*to one longitudinal marginal portion of said plate on at least one side of the plate with the remainder of the sheets projecting radially outwardly therefrom and freely flexible relative thereto for operation upon a work surface; fastener means penetrating said root portions and the outer longitudinal marginal portion of said anchor plate and securing said root portions to said plate in relatively rigid and compressed condition in which said root portions are interlocked against one another to reinforce one another against bending along the longitudinal axis of said plate, and with the inner longitudinal marginal portion of said plate projecting inwardly from the pack and receivable in a respective slot of said hub and deriving support therefrom to support the pack against tilting circumferentially of the hub cylinder, the ends of said anchor plate protruding axially from said pack for engagement by said retainer lips to secure the stack against radially outward displacement from the hub, a plurality of said abrasive units, when assembled on said hub, being disposed in abutting relation to one another whereby to further reinforce them against circumferential bending movements; said pack of sheets having aligned inner end edges cooperatively defining at least one circumferentially projecting shoulder for engagement with the hub periphery to brace said stack against circumferential deflection.*

*17. A rotary abrasive drum including an elongated cylindrical hub having a plurality of circumferentially spaced axially extending radial slots and having retainer means; a plurality of replaceable segmental abrasive units, each comprising: a relatively rigid elongated anchor plate, a pack of relatively flexible abrasive sheets having respective root portions in overlapping relation to the outer longitudinal marginal portion of said plate on at least one side thereof with the remainder of the sheets projecting radially outwardly therefrom and freely flexible relative thereto for operation upon a work surface; fastener means penetrating said root portions and anchor plate and securing said root portions to said plate in relatively rigid and compressed condition in which said root portions are interlocked against one another to reinforce one another against bending along the longitudinal axis of said plate, and with the inner longitudinal marginal portion of said plate projecting inwardly from the pack, received in a respective slot of said hub and deriving support therefrom to support the pack against tilting circumferentially of the hub, at least a portion of the radially outward extremity of said anchor plate projecting from the pack in engagement with said retainer means to anchor the abrasive unit against radially outward displacement from the hub; said root portions collectively constituting a substantially rigid butt section providing at the inner margin of said pack, a shoulder extending transversely from a face of said anchor plate, said pack being of substantially rectangular cross section in a plane normal to said anchor plate face when its component leaves are in face-to-face contact; whereby a plurality of said abrasive units are assembled in annular array about said hub with said anchor plates mounted in respective hub slots, with said shoulders disposed externally of the hub, with said butt sections arranged in circumferential adjacency to one another in annular array about said periphery, and with the outward portions of said abrasive-coated sheets extending radially outwardly with increasing circumferential spacing toward their outward extremities so as to provide maximum circumferential flexibility in the working tips thereof.*

*18. A replaceable segmental abrasive unit adapted to be removably mounted in a hub having an axial slot and having retainer means, comprising: a relatively rigid elongated anchor plate, a pack of relatively flexible abrasive sheets having respective root portions in overlapping relation to said plate on at least one side thereof with the remainder of the sheets projecting radially outwardly therefrom and freely flexible relative thereto for operation upon a work surface; fastener means penetrating said root portions and anchor plate and securing said root portions to said plate in relatively rigid and compressed condition in which said root portions are interlocked against one another to reinforce said plate against bending along its longitudinal axis, said plate being receivable in a respective slot of said hub and deriving support therefrom to support the pack against tilting circumferentially of the hub, at least a portion of the radially outward extremity of said anchor plate having projecting anchor means for engagement with said retainer means to anchor the abrasive unit against radially outward displacement from the hub; said root portions collectively constituting a substantially rigid butt section providing, at the inner margin of said pack, a shoulder extending transversely from a face of said anchor plate, said pack being of substantially rectangular cross section in a plane normal to said anchor plate face when its component leaves are in face-to-face contact, whereby a plurality of said abrasive units may be assembled in annular array about said hub with said anchor plates mounted in respective hub slots, with said shoulders disposed externally of the hub periphery, with said butt sections arranged in circumferential adjacency to one another in annular array about said periphery, and with the outward portions of said abrasive-coated sheets extending radially outwardly with increasing circumferential spacing toward their outward extremities so as to provide maximum circumferential flexibility in the working tips thereof.*

*19. A rotary abrasive drum including a hub and a plurality of discardible segmental abrasive units removably mounted therein, said hub having circumferentially spaced axial slots and having retainer means, each of said abrasive units comprising a relatively rigid elongated anchor plate, a pack of relatively flexible abrasive sheets having respective root portions in overlapping relation to said plate on at least one side thereof with the remainder of the sheets projecting radially outwardly therefrom and freely flexible relative thereto for operation upon a work surface; fastener means penetrating said root portions and anchor plate and securing said root portions to said plate in relatively rigid and compressed condition in which said root portions are interlocked against one another to reinforce one another against bending along the longitudinal axis of said plate, said plate being received in a respective slot of said hub to support the abrasive unit on the hub, at least a portion of the radially outward extremity of said anchor plate projecting from the pack and engaging said retainer means to anchor the abrasive unit against radially outward displacement from the hub.*

*20. A rotary abrasive drum having replaceable abrasive means, comprising: a plurality of segmental abrasive units each comprising a relatively rigid elongated anchor plate, a pack of relatively flexible abrasive sheets on at least one side of said anchor plate, having respective root portions in overlapping relation to the outer longitudinal marginal portion of said plate with the remainder of the sheets projecting radially outwardly therefrom and free of restraint by said anchor plate in flexing circumferentially in engagement with a work surface; fastener means penetrating said root portions and anchor plate and securing said root portions to said plate in compressed condition in which said root portions are interlocked against one another, securely held by said plate in respective radial planes, and mutually reinforced against bending along the longitudinal axis of said plate, and with an exposed longitudinal marginal portion of said plate projecting radially inwardly from the root portion of the pack to a substantial radial depth; and an axially elongated hub including retainer means and having respective pairs of circumferentially spaced opposed walls defining respective axially extending radial slots, the spacing and radial depth of said walls being such as to provide a fitted embracing engagement of the said exposed marginal portions of the plates, such as to support the respective abrasive units in respective radial-axial*

*planes, resisting circumferential tilting of the units and concentrating the flexing of said abrasive sheets in the areas thereof projecting radially outwardly beyond the outer longitudinal margins of said anchor plates; at least a portion of the radially outward extremity of each anchor plate projecting from the stack for engagement with its retainer means to anchor the abrasive unit against radially outward displacement from the hub.*

*21. In an abrasive drum: a hub having a plurality of circumferentially spaced axially extending radial slots and retaining means; a plurality of abrasive segments each comprising a relatively rigid anchor plate in the form of an elongated strip of sheet material and a pack of relatively flexible abrasive sheets having root portions secured in overlapping relation to said anchor plate with a portion of the width of the plate projecting from said pack and received in a respective one of said hub slots, said projecting portion having means cooperable with said retaining means for anchoring the segment to the hub, said root portions of the abrasive sheets being secured under compression to the respective anchor plates to provide relatively solid butt sections in the respective abrasive segments, which butt sections have thickness projecting circumferentially from said anchor plate, such as to be substantially in contact with one another circumferentially of the drum to provide a substantially closed core encircling said hub, whereby said segments are braced one against another and thereby reinforced against bending about axes parallel to the hub axis, said abrasive sheets having their outer portions projecting radially from said substantially closed core in diverging relation to one another to provide a relatively loose circumferential array of abrasive flaps at the working periphery of the drum.*

*22. A rotary abrasive drum having discardible and replaceable abrasive means, comprising: a plurality of segmental abrasive units each comprising a relatively rigid*

*elongated anchor plate, a pack of relatively flexible abrasive sheets on at least one side of said anchor plate, having respective root portions in overlapping relation to the outer marginal portion of said plate with the remainder of the sheets projecting radially outwardly beyond the outer longitudinal margin of said anchor plate so as to be free to flex circumferentially in engagement with a work surface; fastener means penetrating said root portions and anchor plate and securing said root portions to said plate in compressed condition in which said root portions are interlocked against one another and securely held by said plate in respective radial planes, and with an exposed longitudinal marginal portion of said plate projecting from the root portions of the pack to a substantial radial depth; and a hub cylinder having respective pairs of circumferentially spaced opposed walls defining respective axially extending radial slots, the spacing and radial depth of said walls being such as to provide a fitted embracing engagement of the faces of said exposed marginal portion of the plates such as to support the respective segments in respective radial planes, resisting circumferential tilting of the segments and concentrating the flexing of said abrasive sheets in the areas thereof projecting radially outwardly beyond the outer longitudinal margins of said anchor plates; said hub cylinder further including means releasably engaging said anchor plates to anchor said segments against radially outward displacement from the hub cylinder*

References Cited in the file of this patent or the original patent

UNITED STATES PATENTS

| | | |
|---|---|---|
| 596,014 | Condon et al. | Dec. 21, 1897 |
| 2,259,475 | Koether | Oct. 21, 1941 |
| 2,599,961 | White | June 10, 1952 |